(12) United States Patent
Miller et al.

(10) Patent No.: US 11,624,325 B2
(45) Date of Patent: Apr. 11, 2023

(54) FACE SEAL ARRANGEMENT FOR REDUCED FORCE AND PRESSURE

(71) Applicant: Raytheon Technologies Corporation, Farmington, CT (US)

(72) Inventors: Jonathan Logan Miller, Belchertown, MA (US); Colin D. Craig, West Hartford, CT (US); Michael M. Davis, North Granby, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/747,158

(22) Filed: May 18, 2022

(65) Prior Publication Data

US 2022/0275760 A1     Sep. 1, 2022

Related U.S. Application Data

(62) Division of application No. 17/104,489, filed on Nov. 25, 2020, now Pat. No. 11,434,828.

(51) Int. Cl.
   *F02C 7/28*          (2006.01)
   *B64D 27/10*       (2006.01)
   (Continued)

(52) U.S. Cl.
   CPC ................ *F02C 7/28* (2013.01); *B64D 27/10* (2013.01); *B64D 35/02* (2013.01); *F02C 3/04* (2013.01);
   (Continued)

(58) Field of Classification Search
   CPC ...... F02C 7/28; F02C 3/04; F02C 7/06; F02C 7/36; B64D 27/10; B64D 35/02;
   (Continued)

(56) References Cited

U.S. PATENT DOCUMENTS 4,082,296 A * 4/1978 Stein ...................... F16J 15/441
                                                         277/400
4,406,466 A     9/1983 Geary, Jr.
(Continued)

FOREIGN PATENT DOCUMENTS

DE         2320681 A1    11/1973
EP         9523899 A1     1/1993
(Continued)

OTHER PUBLICATIONS

European Search Report for EP Application No. 21210590.2 dated Feb. 15, 2022.

*Primary Examiner* — Jesse S Bogue
(74) *Attorney, Agent, or Firm* — Carlson, Gaskey & Olds, P.C.

(57) ABSTRACT

A bearing is mounted to a static structure outwardly of the shaft, and supporting the shaft. A bearing compartment is defined by face seal arrangements on each of two axial sides of a bearing. Each face seal arrangement includes a seal seat rotating with the shaft and a non-rotating sealing ring. The seal housing is exposed to high pressure air outward of the bearing compartment. A coil spring biases the seal housing towards the seal seat, such that the sealing face is biased into contact with the seal seat by a bias force including a net fluid force acting on the seal housing and the coil spring. The sealing face is defined by a contact portion contacting the seal seat and a feed portion recessed from the seal seat. The feed portion includes a plurality of circumferentially spaced feed slots fluidly connected to at least one annular groove.

20 Claims, 10 Drawing Sheets

(51) Int. Cl.
*B64D 35/02* (2006.01)
*F02C 3/04* (2006.01)
*F02C 7/06* (2006.01)
*F02C 7/36* (2006.01)
*F16J 15/34* (2006.01)
*F16H 1/28* (2006.01)

(52) U.S. Cl.
CPC .................. *F02C 7/06* (2013.01); *F02C 7/36* (2013.01); *F16J 15/34* (2013.01); *F05D 2220/32* (2013.01); *F05D 2240/55* (2013.01); *F05D 2240/60* (2013.01); *F05D 2260/40* (2013.01); *F05D 2300/224* (2013.01); *F16H 1/28* (2013.01)

(58) Field of Classification Search
CPC ........ F16J 15/34; F16J 15/3416; F16J 15/346; F05D 2220/32; F05D 2240/55; F05D 2240/60; F05D 2260/40; F05D 2300/224; F16H 1/28; F01D 25/162; F01D 25/183; F01D 11/003

See application file for complete search history.

(56) References Cited

U.S. PATENT DOCUMENTS

| | | | | |
|---|---|---|---|---|
| 5,058,904 | A | * | 10/1991 | Nevola .................. F16J 15/30 277/399 |
| 5,088,745 | A | | 2/1992 | Peppiatt et al. |
| 5,174,584 | A | * | 12/1992 | Lahrman ............... F01D 11/003 277/400 |
| 5,558,341 | A | * | 9/1996 | McNickle ............ F16J 15/3488 277/400 |
| 9,695,940 | B2 | | 7/2017 | Haynes et al. |
| 9,951,873 | B2 | * | 4/2018 | Inoue .................... F16J 15/162 |
| 10,539,034 | B2 | | 1/2020 | Miller |
| 11,168,573 | B2 | * | 11/2021 | Garrison ................ F16J 15/442 |
| 2002/0093141 | A1 | * | 7/2002 | Wang .................. F16J 15/3412 277/358 |
| 2014/0069100 | A1 | | 3/2014 | Larson |
| 2015/0167846 | A1 | * | 6/2015 | Haynes .................... F16J 15/34 277/350 |
| 2016/0032840 | A1 | | 2/2016 | James |
| 2016/0333711 | A1 | | 11/2016 | Miller |
| 2018/0187785 | A1 | | 7/2018 | Katori et al. |
| 2019/0178381 | A1 | | 6/2019 | Miller et al. |
| 2019/0195078 | A1 | * | 6/2019 | Blais .................... F16J 15/3444 |
| 2021/0080006 | A1 | | 3/2021 | Sasaki et al. |

FOREIGN PATENT DOCUMENTS

| | | |
|---|---|---|
| GB | 920892 A | 3/1963 |
| WO | 2019/236524 A1 | 12/2019 |

\* cited by examiner

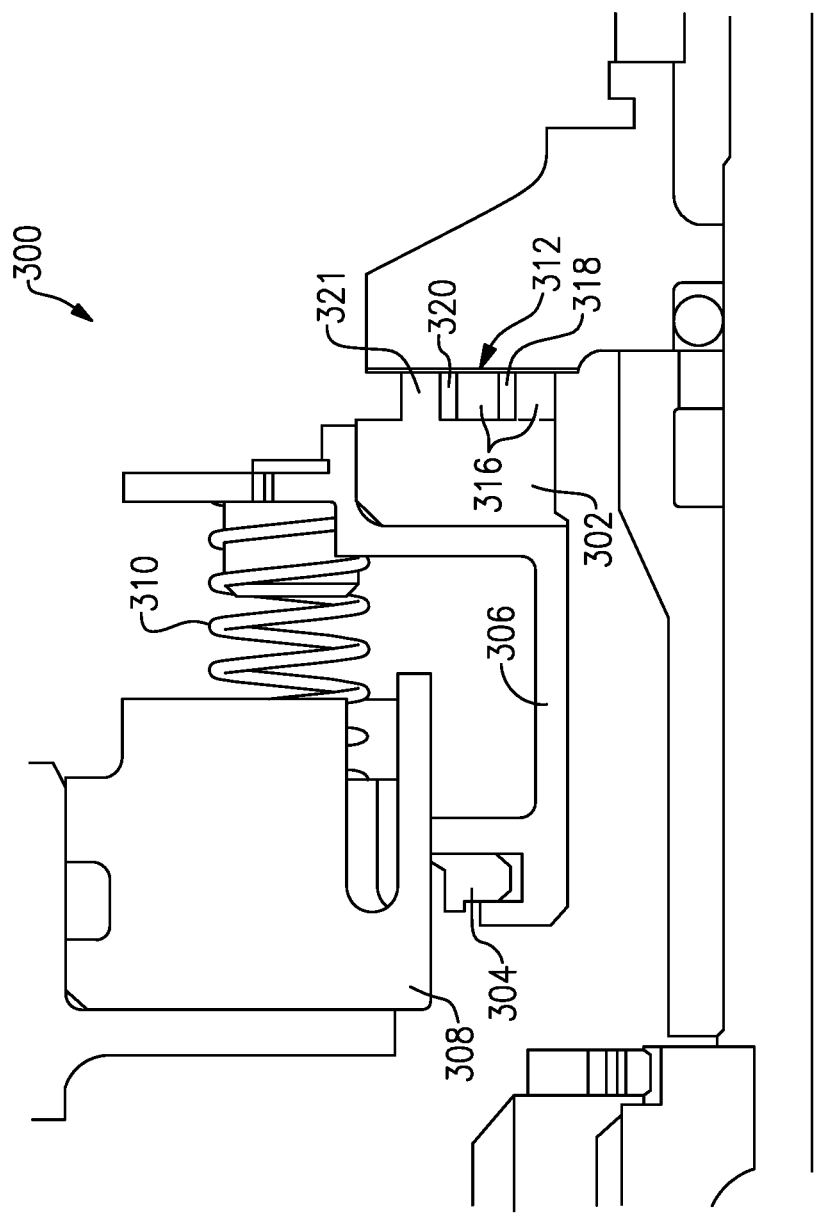

FACE SEAL ARRANGEMENT FOR REDUCED FORCE AND PRESSURE

CROSS REFERENCE TO RELATED APPLICATION

This application is a divisional of U.S. patent application Ser. No. 17/104,489 filed on Nov. 25, 2020.

BACKGROUND OF THE INVENTION

This application relates to face seals as utilized in gas turbine engines.

Gas turbine engines are known, and typically include a fan delivering air into a bypass duct for propulsion, and into a core engine where it is compressed. The compressed air is delivered into a combustor where it is mixed with fuel and ignited. Products of this combustion pass downstream over turbine rotors, driving them to rotate. The turbine rotors, in turn, drive compressor rotors and the fan. Shafts connect the turbine rotors to the compressor and fan rotors.

Bearings support these shafts. The bearings may be provided with lubricant, and thus it is desirable to seal a compartment on each axial side of the bearings.

Face seal arrangements are utilized in the prior art. A seal seat rotates with the shaft on each side of the bearing. A face seal is biased in the contact with the seal seat.

Typically a spring force biases the face seal into the seal seat. Pressurized air acting on a surface of the face seal also provides a bias force.

In the prior art, either the contact pressure or net closing force of the face seal against the seal seat has been relatively high. This has resulted in challenges for operation of the prior face seal arrangements. High contact pressure and high net closing force acting on such face seals results in high heat generation, additional engine system friction losses, higher component temperatures, and reduced service life.

SUMMARY OF THE INVENTION

In a featured embodiment, a gas turbine engine includes a core engine including a compressor section having at least one compressor rotor, a combustor section, and a turbine section including at least one turbine rotor. At least one turbine rotor is connected to drive a shaft about an engine axis which, in turn, is connected to drive the at least one compressor rotor. A bearing is mounted to a static structure outwardly of the shaft, and supporting the shaft. A bearing compartment is defined by face seal arrangements on each of two axial sides of the bearing. Each face seal arrangement includes a seal seat rotating with the shaft and a non-rotating sealing ring. Each non-rotating sealing ring is mounted to a seal housing and includes a sealing face biased into contact with the seal seat. The seal housing is exposed to high pressure air outward of the bearing compartment. A coil spring biases the seal housing towards the seal seat, such that the sealing face is biased into contact with the seal seat by a bias force including a net fluid force acting on the seal housing and the coil spring. The sealing face is defined by a contact portion contacting the seal seat and a feed portion recessed from the seal seat. The feed portion includes a plurality of circumferentially spaced feed slots fluidly connected to at least one annular groove.

In another embodiment according to the previous embodiment, high pressure air from outside the bearing compartment is communicated through the plurality of circumferentially spaced feed slots to the at least one annular groove.

In another embodiment according to any of the previous embodiments, the sealing ring further includes a ditch at a radially outermost location adjacent to the seal housing. The contact portion includes an axial nose portion defined as an annular portion radially outward of the at least one annular groove and radially inward of the ditch.

In another embodiment according to any of the previous embodiments, the feed portion is recessed axially at a feed depth of $D_f$ from the sealing face. The axial nose portion extends axially forward from the ditch at an extension distance $D_n$. A ratio of feed depth $D_f$ to axial nose extension $D_n$ is between 0.1 and 10.0.

In another embodiment according to any of the previous embodiments, the ratio of feed depth $D_f$ to axial nose extension $D_n$ is between 0.5 and 1.4.

In another embodiment according to any of the previous embodiments, the plurality of circumferentially spaced feed slots extend radially from an inner diameter of the sealing face to the at least one annular groove at a length of $L_f$. The axial nose portion extends radially outward from the at least one annular groove to the ditch at a thickness $L_n$. A ratio of feed slot length $L_f$ to axial nose thickness $L_n$ is between 0.07 and 12.4.

In another embodiment according to any of the previous embodiments, a ratio of feed slot length $L_f$ to axial nose thickness $L_n$ is between 0.5 and 4.94.

In another embodiment according to any of the previous embodiments, the feed portion is recessed axially at a feed depth of $D_f$ from the sealing face. The axial nose portion extends axially forward from the ditch at an extension distance $D_n$. A ratio of feed depth $D_f$ to axial nose extension $D_n$ is between 0.1 and 10.0.

In another embodiment according to any of the previous embodiments, the ratio of feed depth $D_f$ to axial nose extension $D_n$ is between 0.5 and 1.4.

In another embodiment according to any of the previous embodiments, a ratio of feed slot length $L_f$ to axial nose thickness $L_n$ is between 0.5 and 4.94.

In another embodiment according to any of the previous embodiments, the ratio of feed depth $D_f$ to axial nose extension $D_n$ is between about 0.5 and 1.4.

In another embodiment according to any of the previous embodiments, the contact portion further includes a plurality of segmented portions in between the circumferentially spaced feed slots.

In another embodiment according to any of the previous embodiments, the plurality of circumferentially spaced feed slots includes between 12 and 60 equally circumferentially spaced feed slots.

In another embodiment according to any of the previous embodiments, the feed portion includes at least two annular grooves and the feed slots extend from an inner diameter of the sealing face through an inner one of the at least two annular grooves and then to an outer one of the at least two annular grooves.

In another embodiment according to any of the previous embodiments, the shaft drives a fan through a gear reduction.

In another embodiment according to any of the previous embodiments, the non-rotating sealing ring is a carbon ring.

In another featured embodiment, a face seal arrangement includes a seal seat for rotating with a shaft about an axis and a non-rotating sealing ring including a mount portion mounted to a seal housing and a sealing face biased into contact with the seal seat by a coil spring. The sealing face is defined by a contact portion contacting the seal seat and a feed portion recessed from the seal seat. The feed portion includes a plurality of circumferentially spaced feed slots fluidly connected to at least one annular groove.

In another embodiment according to any of the previous embodiments, the non-rotating sealing ring is a carbon seal.

In another embodiment according to any of the previous embodiments, the sealing ring further includes a ditch at a radially outermost location adjacent to the seal housing. The contact portion includes an axial nose portion defined as an annular portion radially outward of the at least one annular groove and radially inward of the ditch. The feed portion is recessed axially at a feed depth of $D_f$ from the sealing face. The axial nose portion extends axially forward from the ditch at an extension distance $D_n$. A ratio of feed depth $D_f$ to axial nose extension $D_n$ is between 0.1 and 10.0.

In another embodiment according to any of the previous embodiments, the plurality of circumferentially spaced feed slots extend radially from an inner diameter of the sealing face to the at least one annular groove at a length of $L_f$. The axial nose portion extends radially outward from the at least one annular groove to the ditch at a thickness $L_n$. A ratio of feed slot length $L_f$ to axial nose thickness $L_n$ is between 0.07 and 12.4.

These and other features of the present invention can be best understood from the following specification and drawings, the following of which is a brief description.

BRIEF DESCRIPTION OF THE DRAWINGS

FIG. 7 shows an eighth embodiment face seal.

DETAILED DESCRIPTION

Figure 1:
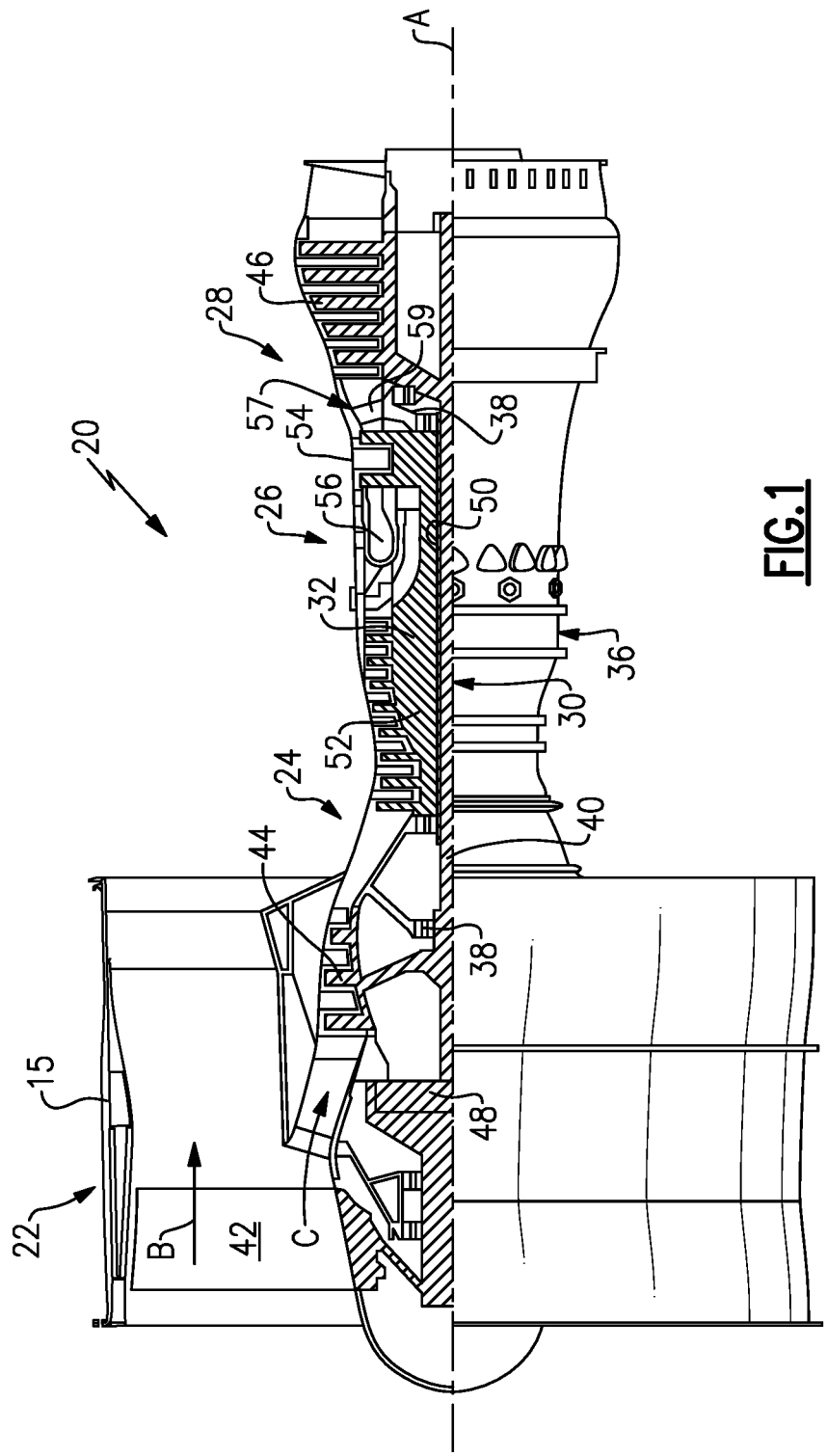
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
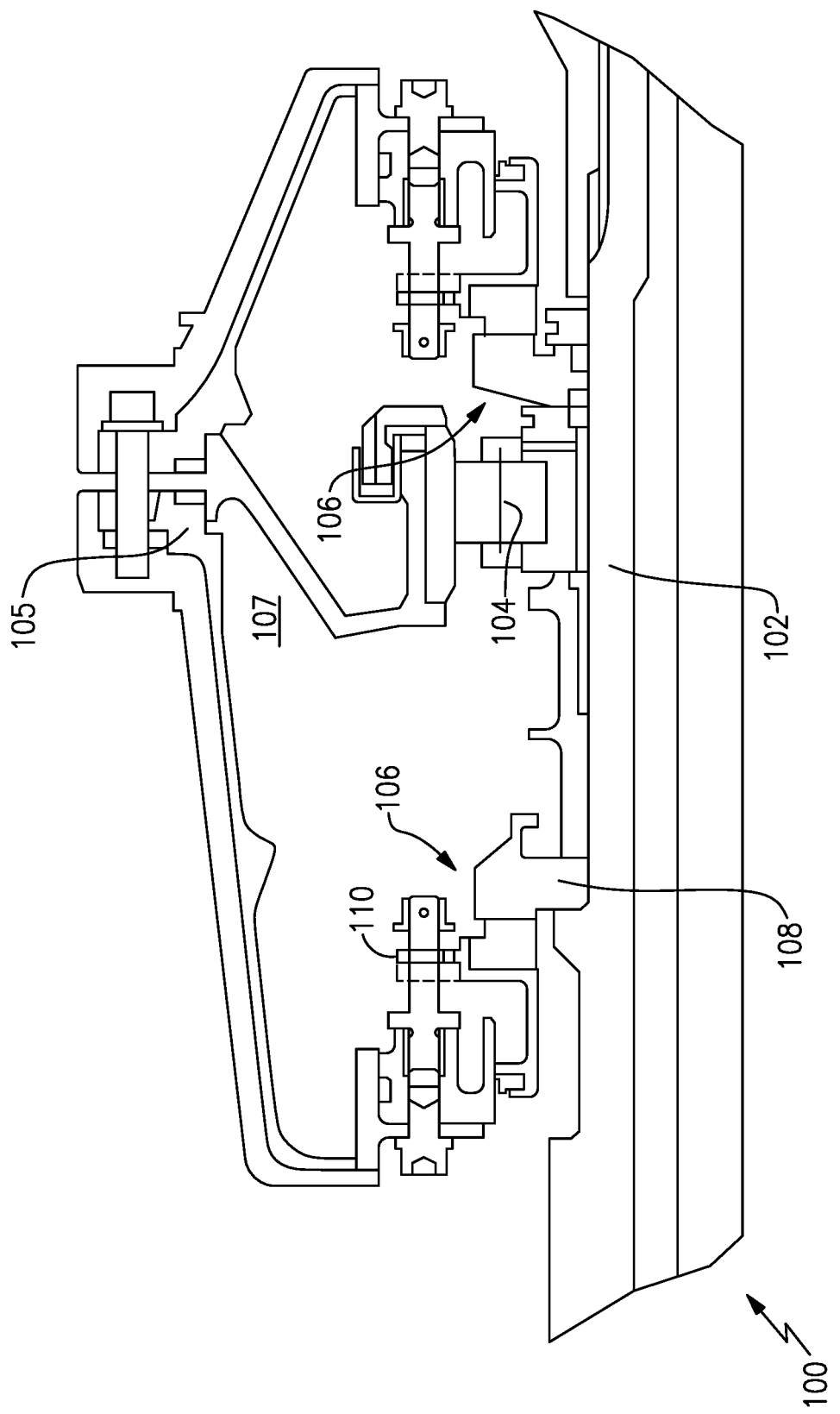
FIG. 2 shows a prior art bearing compartment in an engine such as the FIG. 1 engine.

In an engine such as FIG. 1, bearings 38 support the shafts. FIG. 2 shows one such bearing 104 supporting an engine shaft 102. A face seal arrangement 106 is shown at each of two sides of a bearing compartment 107. As known, bearing compartment 107 may be supplied with lubricant, and the face seal arrangements 106 seal the compartment to resist migration of the lubricant outwardly of the compartment 107.

The face seal arrangements 106 include a rotating seal seat 108 which rotates with the shaft 102, and non-rotating face seal 110.

Figure 3:
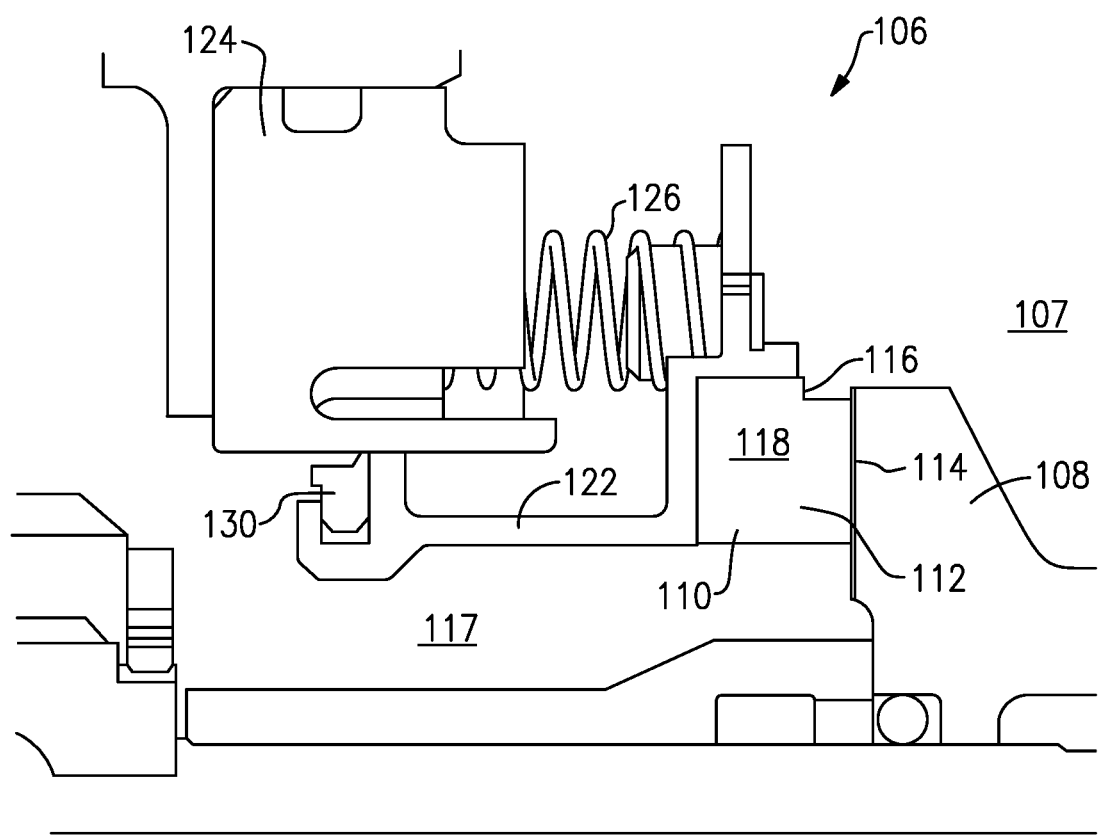
FIG. 3 shows detail of a prior art face seal and seal seat.

FIG. 3 shows details of face seal arrangement 106 having the seal seat 108 and the face seal 110. Non-rotating face seal 110 includes a sealing ring 112 having a sealing face 114 biased into contact with the seal seat 108. The sealing ring 112 includes a mount portion 118 and a ditch portion 116 radially outward of the sealing face 114.

A seal housing 122 carries the sealing ring 112 and provides a mount area for a coil spring 126. Sealing ring 112 may be mounted to seal housing 122 by a radial interference fit and/or by an epoxy or adhesive.

A secondary seal 130 mounted on seal housing 122 and seals against a seal support case 124. Chamber 117 is associated with secondary seal 130 and is at a relatively high pressure and compartment 107 is at a relatively low pressure. A net fluid force biases seal housing 122 towards seal seat 108. Both the net fluid force and the force of the coil springs 126 bias the sealing ring sealing face 114 against the rotating seal seat 108. The fluid force will be explained below.

Note, FIGS. 2 and 3 are not drawn to scale.

In the prior art, it had been proposed to radially increase or decrease the radial width of sealing ring sealing face 114. However, due to summation of forces principals and rigid variations in contacting area, the prior art was not able to achieve optimum results for both contact pressure and net closing force.

Figure 4:
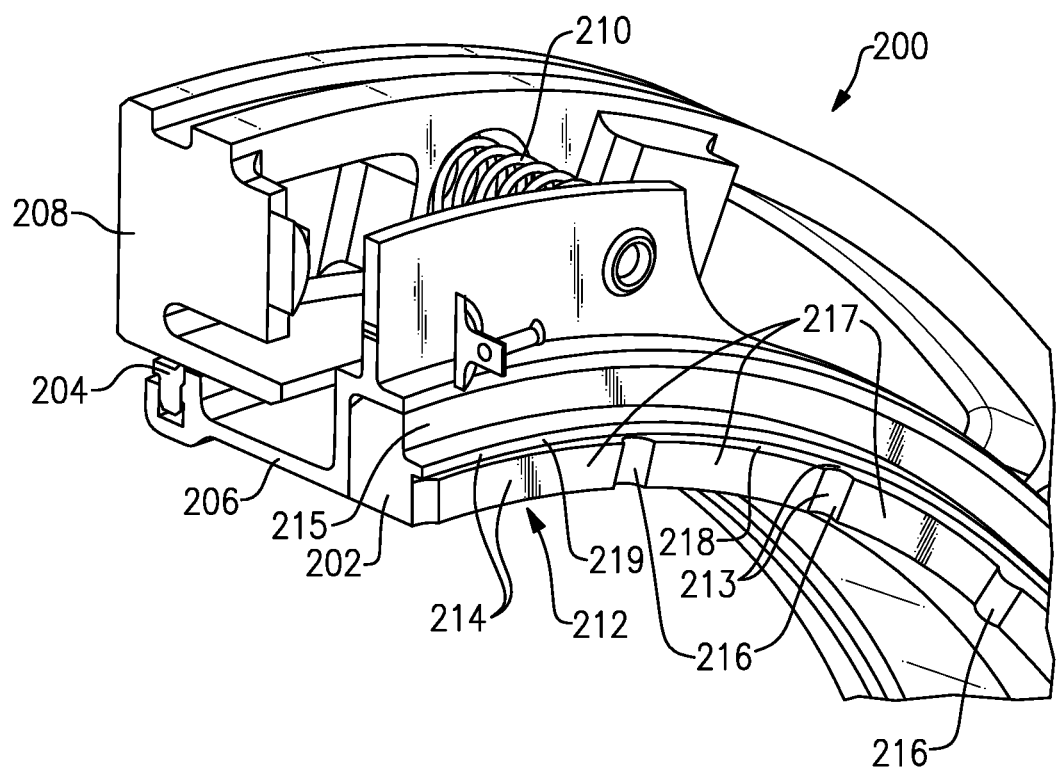
FIG. 4 shows a perspective view cross-section of a first embodiment face seal.

FIG. 4 illustrate a face seal arrangement 200 which accomplishes reduced contact pressure and net closing force while maintaining an appropriate seal. The face seal arrangement 200 includes a sealing ring 202, a secondary seal 204, a seal housing 206, a seal support case 208, and coil springs 210. Sealing ring 202 includes a sealing face 212 defined by a feed portion 213, a contact portion 214, and an outer ditch 215. The secondary seal 204 is mounted on seal housing 206 and seals against seal support case 208. Note sealing ring 202 may be a carbon ring. Sealing ring 202 may be made from graphite carbon, electrographitic carbon, or from other non-carbon materials such as, but not limited to, ceramics, metallics, or polytetrafluoroethylene blends.

Feed portion 213 includes a plurality of circumferentially spaced feed slots 216 and an annular groove 218. There may be between about 2 and 200 feed slots depending on the diameter of the sealing ring 202. Preferably there may be between about 12 and 60 feed slots 216 equally spaced circumferentially about sealing face 212. More narrowly, there may be between about 20 and 28 feed slots 216. The annular groove 218 runs throughout the entire 360° circumference of the sealing face 212 and is in fluid communication with feed slots 216.

Contact portion 214 includes a plurality of segmented portions 217 between the plurality of circumferentially spaced feed slots 216 and an axial nose portion 219. Outer ditch 215 is a recessed portion of sealing face 212 adjacent to a radially outermost portion of seal housing 206, and radially outward of nose portion 219.

Figure 5:
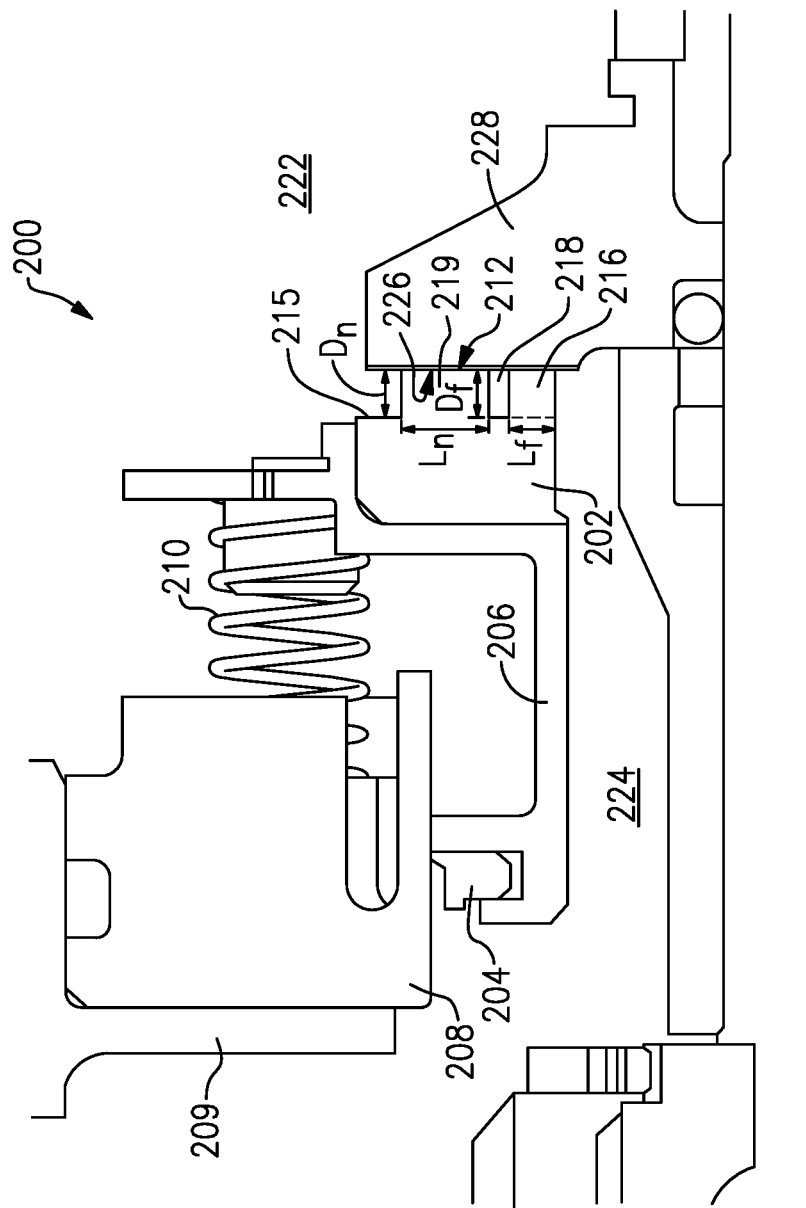
FIG. 5 shows a cross-section of the first embodiment face seal.

FIG. 5 shows a cross section of face seal arrangement 200 installed within a gas turbine engine. In the illustrated embodiment, face seal arrangement 200 resists leakage between a high pressure compartment 224 and a low pressure compartment 222. Seal support case 208 is mounted to a non-rotating engine structure 209 to support the face seal arrangement 200. A net fluid force and a force applied by springs 210 bias the sealing face 212 of the face seal 202 against a seal seat face 226 of seal seat 228. The contact portion 214 of sealing face 212 contacts seal seat face 226 and the feed portion 213 is recessed from seal seat face 226.

Face seal arrangement 200 may be used in a geared gas turbine engine, such as engine 20, and low pressure compartment 222 may be a bearing compartment supporting the low speed spool 30 or high speed spool 32 as illustrated in FIG. 1. Further, low pressure compartment 222 may be a bearing compartment associated with geared architecture 48 illustrated in FIG. 1. Seal seat 228 may be a rotor associated with any of the low pressure turbine 46, high pressure turbine 54, low pressure compressor 44, high pressure compressor 52, fan 42, or geared architecture 48 illustrated in FIG. 1. Face seal arrangement 200 may also be used in direct drive engines.

In operation, high pressure fluid from compartment 224 is communicated through the feed slots 216 to the annular groove 218. The high pressure fluid within the feed slots 216 and annular groove 218 provides a counter force to the bias of the fluid force and the springs. This counter force advantageously reduces both the contact pressure and the net closing force of the contact portion 214 of sealing face 212 against rotating seal seat face 226 to, in turn, increase the service life of face seal arrangement 200, and reduce engine friction losses and heat generation.

The axial nose portion 219 is an annular portion radially outward of the annular groove 218. Axial nose portion 219 extends axially forward from the outer ditch 215 at an extension distance $D_n$ and extends radially outward from the annular groove 218 to the outer ditch 215 at a thickness $L_n$. The feed slots 216 extend radially from the inner diameter of the sealing face 212 to the annular groove 218 at a length of $L_f$, and both the feed slots 216 and the annular groove 218 are recessed axially at a feed depth of $D_f$ from the sealing face. While the feed slots 216 and the annular groove 218 are disclosed as having the same depth $D_f$, they could have different depths.

The geometric design of sealing face 212 may be optimized for specific configurations. For example, to accommodate a specific pressure differential between compartments 222 and 224 or a specific rotational speed of seal seat face 226, it may be desirable to increase or decrease at least one of the contact area of the contacting portion 214 or the counter force provided by the feed portion 213.

Figure 6A:
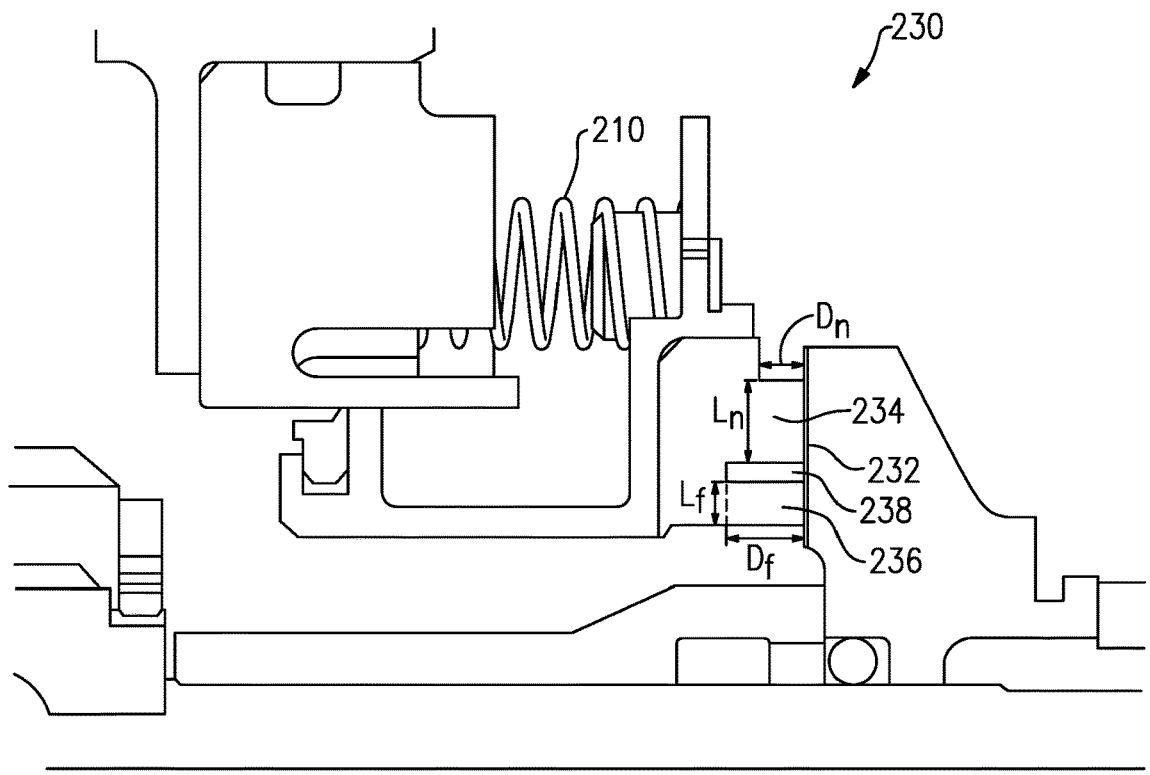
FIG. 6A shows second embodiment face seal.

The geometric design of sealing face 212 may be optimized by varying the relative geometric sizes of the feed portion 213 and contact portion 214 by varying feed depth $D_f$ relative to the axial nose extension $D_n$ and feed slot length $L_f$ relative to the axial nose thickness $L_n$. Generally, an increase in feed depth $D_f$ relative to axial nose extension $D_n$ (as shown in FIGS. 6A and 6D) may increase the high pressure fluid communicated through feed portion 213 in operation and may increase the counter force as well as provide more counter force when wear is experienced in the sealing face 212. An increase in feed slot length $L_f$ relative to the axial nose thickness $L_n$ (as shown in FIGS. 6D, 6E, 6F) may similarly increase the counter force while maintaining a large total contact area of the contacting portion 214, which will enable a net reduction in closing force and reduction in contact pressure.

The extension $D_n$ of the axial nose portion 219 may be greater than, less than, or about equal to the feed depth $D_f$. However, a ratio of feed depth $D_f$ to axial nose portion 219 extension $D_n$ is preferably between about 0.1 and 10.0. More narrowly, the ratio of $D_f$ to $D_n$ is between about 0.5 and 1.4. These ranges assist in maintaining an appropriate net bias force acting on the seal for variations in expected amount of wear on the seal face, as well as accounting for application specific structural concerns.

The thickness $L_n$ of the axial nose portion 219 may be greater than, less than, or about equal to the feed slot 216 length $L_f$. However, a ratio of feed slot 216 length $L_f$ to axial nose thickness $L_n$ is preferably between 0.07 and 12.4. More narrowly, the ratio of $L_f$ to $L_n$ is between about 0.5 and 4.94. These ranges assist in achieving an appropriate counterforce to reduce net force and contact pressure while maintaining an appropriate seal.

Both the ratio of $D_f$ to $D_n$ and $L_f$ to $L_n$ are varied to account for unique structural limitations and expected wear considerations of specific seal applications.

FIGS. 6A, 6B, 6C, 6D, 6E, and 6F illustrate embodiments of face seal assemblies with varying feed depth $D_f$ to axial nose portion extension $D_n$ and varying feed slot length $L_f$ to axial nose thickness $L_n$ ratios.

FIG. 6A illustrates an embodiment face seal arrangement 230 including a sealing face 232 including an axial nose portion 234, circumferentially spaced feed slots 236 and annular groove 238. Face seal arrangement 230 is configured similarly to face seal arrangement 200. As shown, the feed depth $D_f$ of feed slots 236 and annular groove 238 is greater than the axial nose portion 234 extension $D_n$, and the feed slot 236 length $L_f$ is less than axial nose portion 234 thickness $L_n$. In the embodiment of FIG. 6A, the ratio of $D_f$ to $D_n$ is about 1.4, and the ratio of $L_f$ to $L_n$ is about 0.5.

Figure 6B:
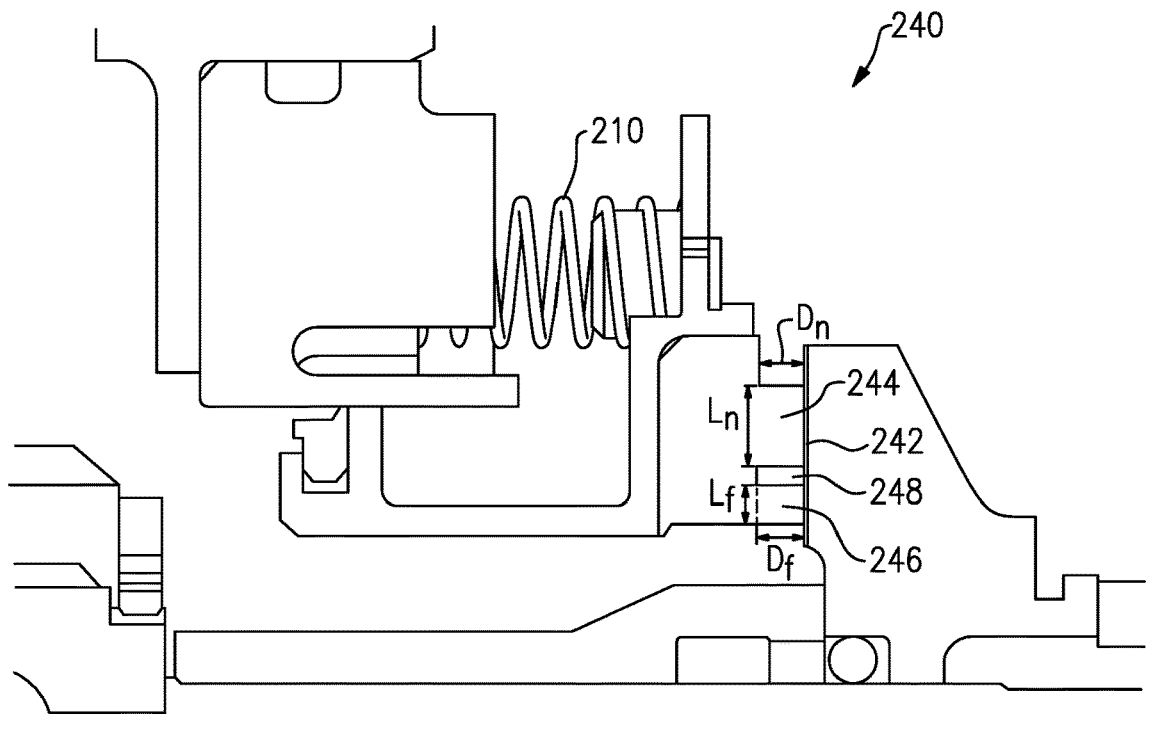
FIG. 6B shows a third embodiment face seal.

FIG. 6B illustrates an embodiment face seal arrangement 240 including a sealing face 242 including an axial nose portion 244, circumferentially spaced feed slots 246 and annular groove 248. Face seal arrangement 240 is configured similarly to face seal arrangement 200. As shown, the feed depth $D_f$ of feed slots 246 and annular groove 248 is about equal to the axial nose portion 244 extension $D_n$, and the feed slot 246 length $L_f$ is less than axial nose portion 244 thickness $L_n$. In the embodiment of FIG. 6B, the ratio of $D_f$ to $D_n$ is about 1.0, and the ratio of $L_f$ to $L_n$ is about 0.5.

Figure 6C:
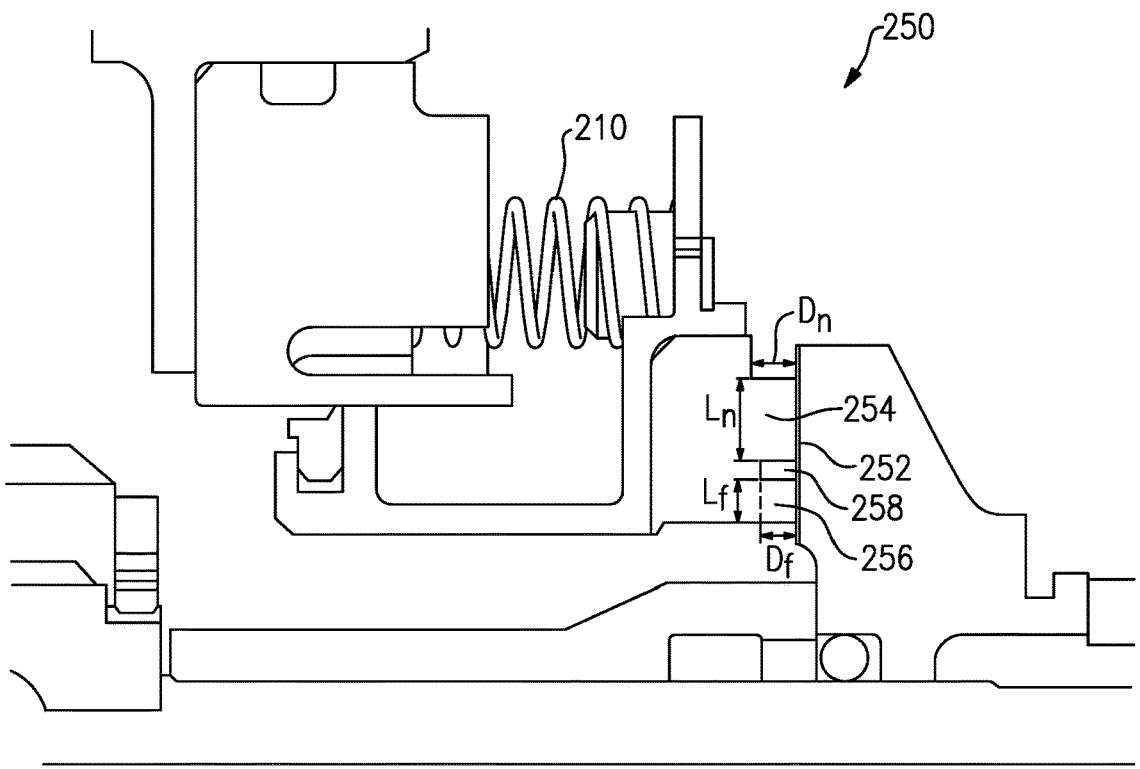
FIG. 6C shows a fourth embodiment face seal.
Figure 6D:
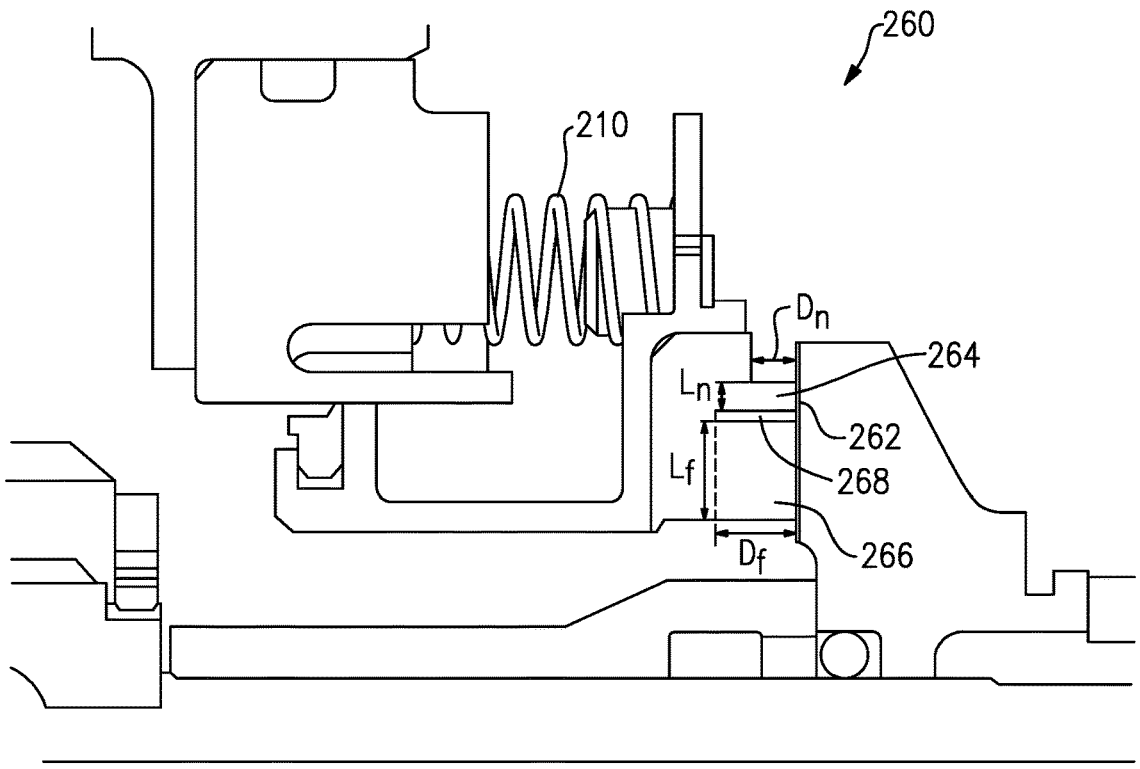
FIG. 6D shows a fifth embodiment face seal.
Figure 6E:
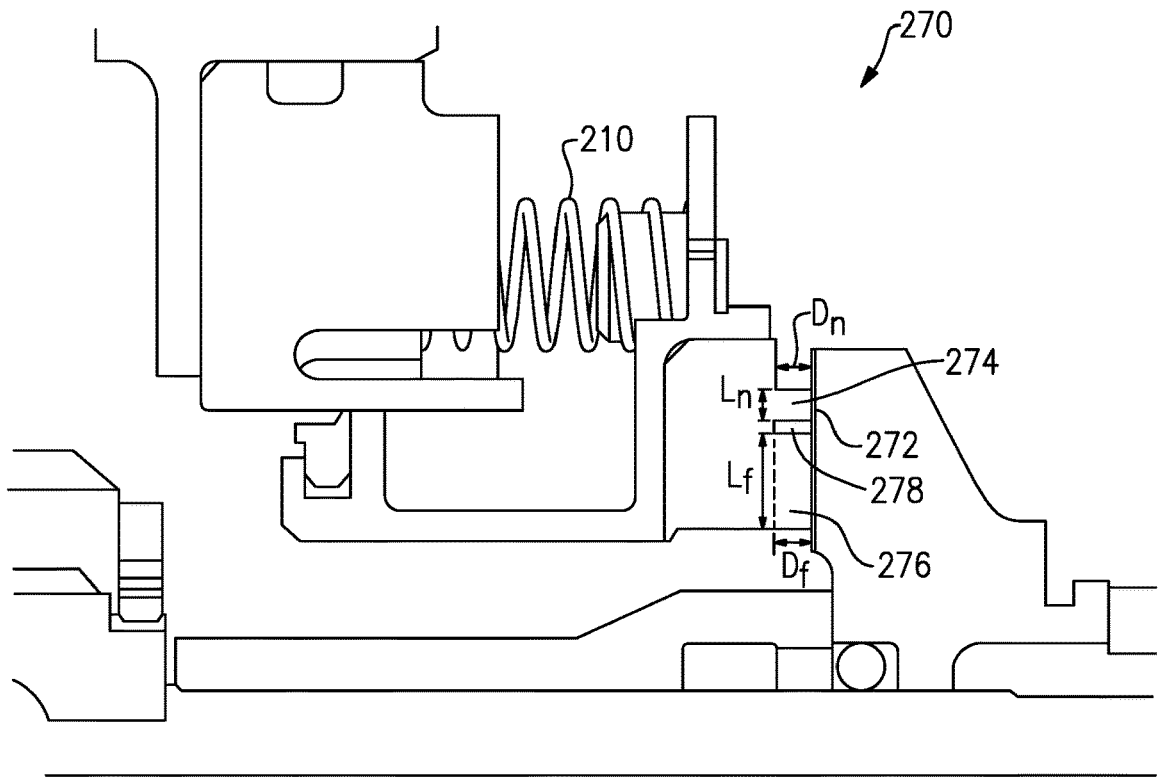
FIG. 6E shows a sixth embodiment face seal.
Figure 6F:
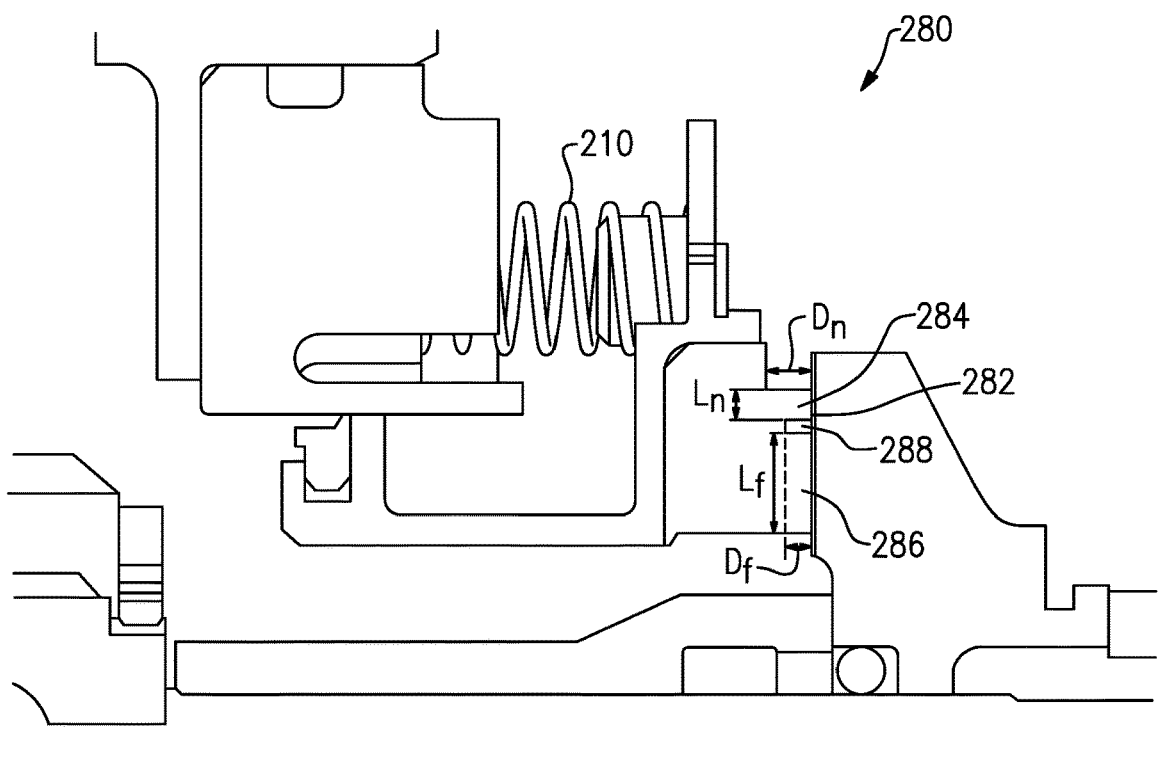
FIG. 6F shows a seventh embodiment face seal.

FIG. 6C illustrates an embodiment face seal arrangement 250 including a sealing face 252 including an axial nose portion 254, circumferentially spaced feed slots 256 and annular groove 258. Face seal arrangement 250 is configured similarly to face seal arrangement 200. As shown, the feed depth $D_f$ of feed slots 256 and annular groove 258 is less than the axial nose portion 254 extension $D_n$, and the feed slot 256 length $L_f$ is less than axial nose portion 254 thickness $L_n$. In the embodiment of FIG. 6C, the ratio of $D_f$ to $D_n$ is about 0.5, and the ratio of $L_f$ to $L_n$ is about 0.5.

FIG. 6D illustrates an embodiment face seal arrangement 260 including a sealing face 262 including an axial nose portion 264, circumferentially spaced feed slots 266 and annular groove 268. Face seal arrangement 260 is configured similarly to face seal arrangement 200. As shown, the feed depth $D_f$ of feed slots 266 and annular groove 268 is greater than the axial nose portion 264 extension $D_n$, and the feed slot 266 length $L_f$ is greater than axial nose portion 264 thickness $L_n$. In the embodiment of FIG. 6D, the ratio of $D_f$ to $D_n$ is about 1.4, and the ratio of $L_f$ to $L_n$ is about 4.9.

FIG. 6E illustrates an embodiment face seal arrangement 270 including a sealing face 272 including an axial nose portion 274, circumferentially spaced feed slots 276 and annular groove 278. Face seal arrangement 270 is configured similarly to face seal arrangement 200. As shown, the feed depth $D_f$ of feed slots 276 and annular groove 278 is about equal to the axial nose portion 274 extension $D_n$, and the feed slot 276 length $L_f$ is greater than axial nose portion 274 thickness $L_n$. In the embodiment of FIG. 6E, the ratio of $D_f$ to $D_n$ is about 1.0, and the ratio of $L_f$ to $L_n$ is about 4.9.

FIG. 6F illustrates an embodiment face seal arrangement 280 including a sealing face 282 including an axial nose portion 284, circumferentially spaced feed slots 286 and annular groove 288. Face seal arrangement 280 is configured similarly to face seal arrangement 200. As shown, the feed depth $D_f$ of feed slots 286 and annular groove 288 is about equal to the axial nose portion 284 extension $D_n$, and the feed slot 286 length $L_f$ is greater than axial nose portion 284 thickness $L_n$. In the embodiment of FIG. 6F, the ratio of $D_f$ to $D_n$ is about 0.5, and the ratio of $L_f$ to $L_n$ is about 4.9.

FIG. 7 shows a cross section of an embodiment face seal arrangement 300. Face seal arrangement 300 includes a carbon seal 302, a secondary seal 304, a seal housing 306, a seal support case 308, and spring coils 310, and is configured similarly to face seal arrangement 200 discussed above. The carbon seal 302 includes a sealing face 312 which includes an axial nose portion 321, a plurality of circumferentially spaced feed slots 316, an inner annular groove 318 and an outer annular groove 320. The inner annular groove 318 and outer annular groove 320 both run throughout the entire 360° circumference of the sealing face 312 and are concentric. Feed slots 316 extend from an inner diameter of the sealing face 312 through the inner annular groove 318 and terminate at the outer annular groove 320. Axial nose portion 321 extends radially outward from outer annular groove 320. In operation, high pressure fluid is communicated through feed slots 316 and is delivered to both inner annular groove 318 and outer annular groove 320 to provide a counter force to the bias of spring 310. The inclusion of two annular grooves 318, 320 allows for additional tuning of the high pressure feed counter force and sealing face 312 contact area. Face seal arrangement 300 may be utilized in a geared engine, such as engine 20, in a similar manner to face seal arrangement 200 discussed above.

Figure 8A:
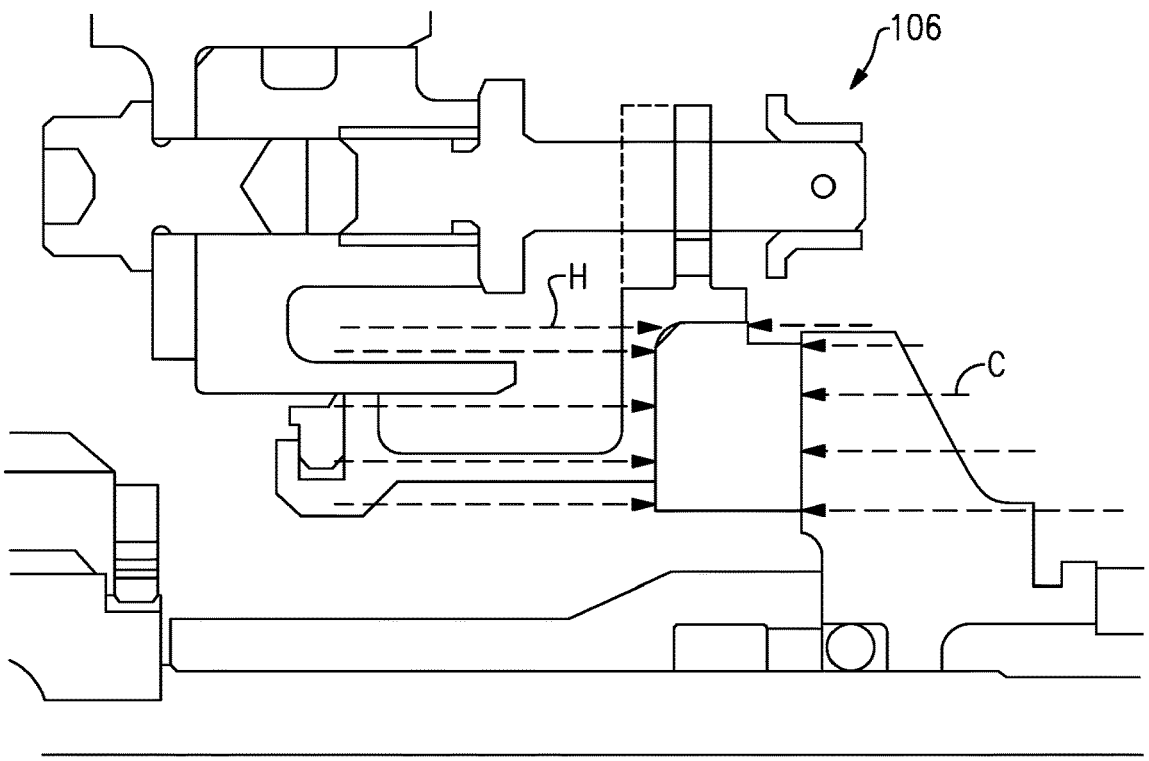
FIG. 8A shows a holding force and a counter force as existed in the prior art seal.
Figure 8B:
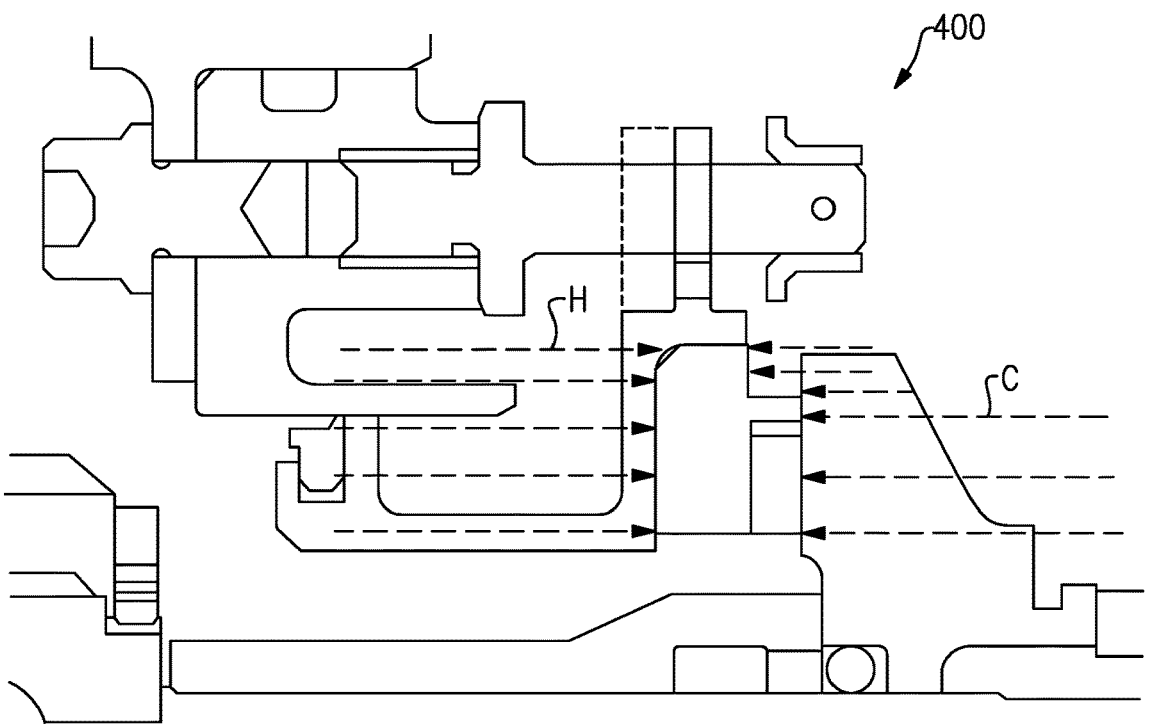
FIG. 8B shows the holding force and counter forces in seals according to this disclosure.

A change in holding forces H biasing the sealing rings towards the seal seats and counter forces C is schematically illustrated in FIG. 8A, which shows the prior art seal 106. FIG. 8B shows seal 400 which is made according to this disclosure. This basic difference would apply to seals made according to any embodiment of this disclosure including those shown in FIG. 5, FIGS. 6A-6F, and FIG. 7.

As shown in FIG. 8A and FIG. 8B, the holding H is relatively the same between the prior art seal 106 and seals 400 made according to this disclosure. However, the counter forces C are different.

As seen in the prior art, the counter forces diminish significantly as one moves in a radially outward direction. Due to the feed slots and grooves of this disclosure, the counter force C for the seals 400 remain high further radially outwardly. This provides the benefits as discussed above.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. A gas turbine engine comprising: a seal seat connected for rotating with a shaft about an axis and a non-rotating sealing ring including a mount portion mounted to a seal housing and a sealing face biased into contact with said seal seat by a coil spring;
and wherein said sealing face is defined by a contact portion contacting the seal seat and a feed portion recessed from the seal seat, said feed portion including a plurality of circumferentially spaced feed slots fluidly connected to at least one annular groove;
and wherein said sealing ring further includes a ditch at a radially outermost location adjacent to said seal housing, and said contact portion includes an axial nose portion defined as an annular portion radially outward of said at least one annular groove and radially inward of said ditch; and
at least one of the following is true:
the feed portion is recessed axially at a feed depth of $D_f$ from the sealing face, the axial nose portion extends axially forward from said ditch at an extension distance $D_n$, and $D_n$ is less than $D_f$; or
the plurality of circumferentially spaced feed slots extend radially from an inner diameter of said sealing face to said at least one annular grove at a length $L_f$, said axial nose portion extends radially outward from at least one annular groove to said ditch at a thickness $L_n$ and said feed slot length $L_f$ is less than said axial nose thickness $L_n$.

2. The gas turbine engine of claim 1, wherein high pressure air from outside the bearing compartment is communicated through the plurality of circumferentially spaced feed slots to the at least one annular groove.

3. The gas turbine engine of claim 2, wherein the feed portion is recessed axially at the feed depth of $D_f$ from the sealing face, the axial nose portion extends axially forward from said ditch at the extension distance $D_n$, and a ratio of feed depth $D_f$ to axial nose extension $D_n$ is greater than 1.0 and less than or equal to 10.0.

4. The gas turbine engine of claim 3, wherein the ratio of feed depth $D_f$ to axial nose extension $D_n$ is greater than 1.0 and less than or equal to 1.4.

5. The gas turbine engine of claim 3, wherein a ratio of feed slot length $L_f$ to axial nose thickness $L_n$ is greater than or equal to 0.07 and less than 1.0.

6. The gas turbine engine of claim 5, wherein the ratio of feed slot length $L_f$ to axial nose thickness $L_n$ is greater than or equal to 0.5 and less than 1.0.

7. The gas turbine engine of claim 5, wherein the contact portion further includes a plurality of segmented portions in between the circumferentially spaced feed slots.

8. The gas turbine engine of claim 1, wherein the plurality of circumferentially spaced feed slots includes between 12 and 60 equally circumferentially spaced feed slots.

9. The gas turbine engine of claim 1, wherein the feed portion includes at least two annular grooves and the feed slots extend from an inner diameter of the sealing face through an inner one of said at least two annular grooves and then to an outer one of said at least two annular grooves.

10. The gas turbine engine of claim 1, wherein said shaft drives a fan through a gear reduction.

11. The gas turbine engine of claim 1, wherein said non-rotating sealing ring is a carbon ring.

12. The gas turbine engine of claim 1, wherein the feed portion is recessed axially at a feed depth of $D_f$ from the sealing face, the axial nose portion extends axially forward from said ditch at an extension distance $D_n$, and a ratio of feed depth $D_f$ to axial nose extension $D_n$ is greater than 1.0 and less than or equal to 10.0.

13. The gas turbine engine of claim 12, wherein the ratio of feed depth $D_f$ to axial nose extension $D_n$ is greater than 1.0 and less than or equal to 1.4.

14. The gas turbine engine of claim 13, wherein a ratio of feed slot length $L_f$ to axial nose thickness $L_n$ is greater than or equal to 0.07 and less than 1.0.

15. The gas turbine engine of claim 1, wherein a ratio of feed slot length $L_f$ to axial nose thickness $L_n$ is greater than or equal to 0.07 and less than 1.0.

16. The gas turbine engine of claim 14, wherein the ratio of feed slot length $L_f$ to axial nose thickness $L_n$ is greater than or equal to 0.5 and less than 1.0.

17. A face seal arrangement comprising: a seal seat for rotating with a shaft about an axis and a non-rotating sealing ring including a mount portion mounted to a seal housing and a sealing face biased into contact with said seal seat by a coil spring;
wherein said sealing face is defined by a contact portion contacting the seal seat and a feed portion recessed from the seal seat, said feed portion including a plurality of circumferentially spaced feed slots fluidly connected to at least one annular groove; and
at least one of the following is true:
and wherein said sealing ring further includes a ditch at a radially outermost location adjacent to said seal housing, and said contact portion includes an axial nose portion defined as an annular portion radially outward of said at least one annular groove and radially inward of said ditch; and
at least one of the following is true:
the feed portion is recessed axially at a feed depth of $D_f$ from the sealing face, the axial nose portion extends axially forward from said ditch at an extension distance $D_n$, and $D_n$ is less than $D_f$; or
the plurality of circumferentially spaced feed slots extend radially from an inner diameter of said sealing face to said at least one annular grove at a length $L_f$, said axial nose portion extends radially outward from at least one annular groove to said ditch at a thickness $L_n$ and said feed slot length $L_f$ is less than said axial nose thickness $L_n$.

18. The face seal arrangement of claim 17, wherein said non-rotating sealing ring is a carbon seal.

19. The face seal arrangement of claim 17, wherein a ratio of feed depth $D_f$ to axial nose extension $D_n$ is greater than 1.0 and less than or equal to 10.0.

20. The face seal arrangement of claim 17, wherein a thickness $L_n$, and a ratio of feed slot length $L_f$ to axial nose thickness $L_n$ is greater than or equal to 0.07 and less than 1.0.

* * * * *